Dec. 22, 1953     T. A. RICH     2,663,610

ELECTRICAL RECORDER

Filed May 9, 1951

Inventor:
Theodore A. Rich,
by Paul A. Frank
His Attorney

Patented Dec. 22, 1953

2,663,610

UNITED STATES PATENT OFFICE 2,663,610

ELECTRICAL RECORDER

Theodore A. Rich, Schenectady, N. Y., assignor to General Electric Company, a corporation of New York Application May 9, 1951, Serial No. 225,431

7 Claims. (Cl. 346—31)

This invention relates to improved apparatus for recording variable quantities.

Sensitive instruments are available for indicating values of voltage or other variable quantities. However, highly sensitive instruments generally do not provide sufficient output torque to operate directly recording devices for making permanent records of such values. Consequently, simple electrical recorders are generally less sensitive than high-sensitivity indicating instruments. In the present invention an instrument of high sensitivity may position a control member, which controls the amount of electric current supplied by an electrical oscillator to an electrical recording device of substantially lower sensitivity. Although recorders of high sensitivity have heretofore been available which employ photoelectric apparatus, such apparatus is relatively complex and costly. A principal object of the present invention is to provide electrical recorders of high sensitivity which are simpler and less costly than those heretofore available.

The features of my invention which I believe to be novel are set forth with particularity in the appended claims. My invention itself, both as to its organization and method of operation, together with further objects and advantages thereof, may best be understood by reference to the following description taken in connection with the accompanying drawing, in which Fig. 1 is a schematic circuit diagram illustrating one embodiment of my invention, and Fig. 2 is a schematic circuit diagram illustrating a second embodiment of the invention.

Figure 1:
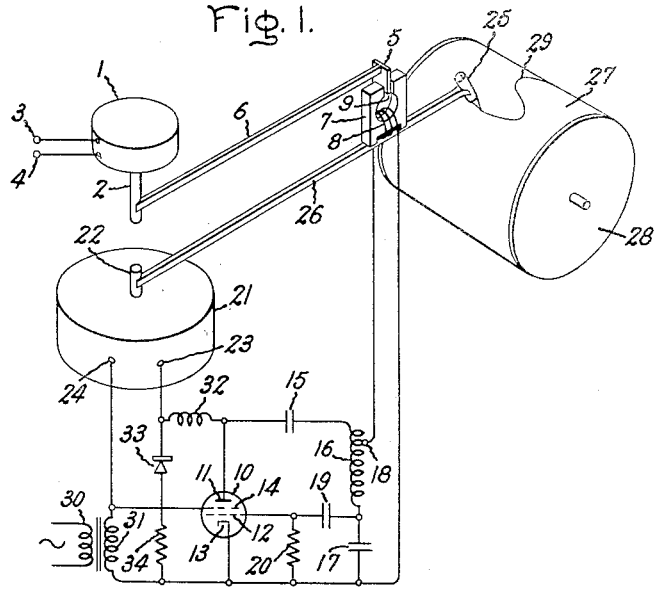
Figure 2:
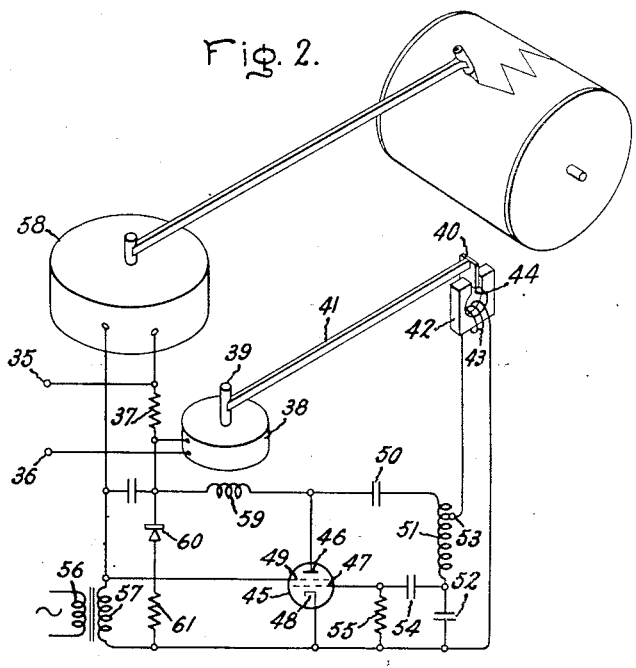

Referring now to Fig. 1 of the drawing, an instrument 1 of any suitable type has a movable element 2 which rotates to different positions in conformity with the varying values of the quantity to be recorded. For example, instrument 1 may be a high-sensitivity voltmeter which responds to values of a voltage applied between input terminals 3 and 4. Alternatively, instrument 1 may be an ammeter, a wattmeter, a pressure gauge, or any instrument having a movable element which responds to values of the quantity to be recorded. A control vane 5 is attached to movable element 2 through an arm 6, so that the position of vane 5 is varied in conformity with variations in value of the quantity to be recorded.

A second control member comprises a magnetic core 7 having a winding 8. Core 7 has an air gap 9, and vane 5 is movable selectively into or out of gap 9 by variations in the relative positions of the control members 5 and 7. Movement of vane 5 inward with respect to the air gap decreases the reluctance of magnetic core 7, and thus increases the inductance of winding 8, while movement of vane 5 outward with respect to the air gap increases the reluctance of magnetic core 7, and decreases the inductance of winding 8.

An electron discharge device 10 has an anode 11, a control electrode 12, and a cathode 13. The electron discharge device may also have other electrodes, such as screen electrode 14, but these are not essential parts of the invention and may be omitted if desired. A capacitor 15, a tapped inductor 16, and a capacitor 17 are connected in series as shown between anode 11 and cathode 13. Winding 8 is connected between the tap 18 of inductor 16 and cathode 13. A capacitor 19 is connected from control electrode 12 to the circuit junction between inductor 16 and capacitor 17. A grid-leak bias resistor 20 is connected between control electrode 12 and cathode 13.

A current-responsive electrical recording device comprises conventional driving mechanism 21 having a movable element 22 which rotates to different positions in conformity with the amount of electric current supplied between terminals 23 and 24. A writing member or pen 25 is attached to movable element 22 through arm 26, and thus is positioned laterally upon chart 27 in conformity with the position of element 22. Chart 27 may be mounted upon a drum 28, which may be rotated slowly by conventional means, not shown, to provide a continuous curve 29 upon the chart which is a graphical record of the quantity recorded.

Means for supplying electric current to the apparatus may comprise a transformer having a primary winding 30 and a secondary winding 31. Alternating current is supplied to primary winding 30 by any suitable means, such as connection to a 60-cycle commercial outlet. Secondary winding 31 is connected in series with the recording device 21, a choke coil 32, and discharge device 10, as shown. Thus the electric potential of control electrode 12, which controls the conductivity of discharge device 10, controls the amount of current supplied to the recording device.

The circuit connections including inductor 16 provide regenerative feedback to discharge device 10, which produces electric oscillations between anode 11 and cathode 13. The voltage drop across winding 8 provides degenerative feedback which limits the amplitude of these oscillations. Since the magnitude of this voltage drop, and hence the amount of degenerative feedback provided, depends upon the inductance value of winding 8, the amplitude of the oscillations between anode 11 and cathode 13 are controlled by the relative positions of control members 5 and 7. Since grid-leak bias resistor 20 provides, in the usual manner, a negative bias potential at control electrode 12 which is substantially proportional to the amplitude of the oscillations produced, the relative positions of members 5 and 7 also control the amount of current supplied to driving mechanism 21 of the recording device.

Improved performance is obtained by connecting a rectifier 33 and a current-limiting resistor 34 in series with transformer secondary winding 31 and the driving mechanism 21 of the recording device, as shown in the drawing. The polarity of rectifier 33 is arranged so that the rectifier provides current through the recording device in the reverse direction to current provided through discharge device 10. Thus, the current through rectifier 33 is a bucking current, which permits a reduction of the net current passing through the recording device to zero value, or to a negative value, without reducing the current through the discharge device to zero.

The operation of this apparatus is as follows: The value of resistor 34 is selected so that the apparatus is in equilibrium, and moving element 22 remains stationary, when control vane 5 is about half-way inside air gap 9. Assume that the voltage applied between input terminals 3 and 4 increases in value. In conformity with this increase, movable element 2 rotates to move control vane 5 further within air gap 9. This decreases the reluctance of magnetic core 7, and thus increases the inductance of winding 8, thereby providing additional degenerative feed-back which reduces the amplitude of oscillations between anode 11 and cathode 13. This decrease in the amplitude of oscillations decreases the negative bias potential applied to control electrode 12 by grid-leak bias resistor 20, so that discharge device 10 conducts a larger amount of current and thus increases the amount of current supplied to driving mechanism 21 of the recording device. In conformity with this increase in current, moving element 22 rotates until control members 5 and 7 are in substantially their original relative positions. The movement of element 22 to restore the relative positions of members 5 and 7 moves writing member 25 to a new position on chart 27, so that curve 29, which is traced on the chart by the writing member, records the new value of the voltage applied between terminals 3 and 4.

When the voltage applied to the input terminals decreases, the reverse action occurs. Since the torque supplied by instrument 1 need only be sufficient to position vane 5, an instrument of very high sensitivity may be employed. Operation of the apparatus always maintains control members 5 and 7 in substantially the same relative positions, so that the recorded values accurately represent the values measured by instrument 1.

Fig. 2 shows a modification of the apparatus which is especially useful in recording the values of a varying voltage in a high impedance circuit, since the Fig. 2 modification employs the potentiometer principle and draws negligible current from the circuit in which voltage is measured. Referring to Fig. 2, a voltage having varying values which are to be recorded is applied between input terminals 35 and 36. A resistor 37 and a sensitive galvanometer 38 are connected in series between terminals 35 and 36. Galvanometer 38 has a current-responsive movable element 39, and preferably has negligible restoring torque, so that the moving element of the galvanometer has little if any tendency to return to any predetermined position when there is no electric current through the galvanometer. A control vane 40 is attached to movable member 39 through an arm 41. A second control member comprises a magnetic core 42 having a winding 43. Core 42 has an air gap 44, and vane 40 is movable selectively into or out of air gap 44 by rotation of movable member 39.

An electron discharge device 45 has an anode 46, a control electrode 47, and a cathode 48. Device 45 may also have other electrodes, such as screen electrode 49, if desired. A capacitor 50, a tapped inductor 51, and a capacitor 52 are connected in series between anode 46 and cathode 48, as shown. Winding 43 is connected between the tap 53 of inductor 51 and cathode 48. A capacitor 54 is connected between control electrode 47 and the circuit junction between inductor 51 and capacitor 52. A grid-leak bias resistor 55 is connected between control electrode 47 and cathode 48.

Electric current is provided by a transformer having a primary winding 56 and a secondary winding 57. Alternating current is supplied to primary winding 56 by any suitable means, such as connections to a 60 cycle commercial outlet. Secondary winding 57 is connected in series with a current-responsive electrical recorder 58 of any suitable type, resistor 37, a choke coil 59 and discharge device 45, so that the electric potential of control electrode 47 controls the amount of current supplied to recording device 58.

A rectifier 60 and a current-limiting resistor 61 are also connected in series with transformer 57, recording device 58, and resistor 37, as shown. The polarity of rectifier 60 is arranged so that the current conducted by the rectifier through recording device 58 is in the reverse direction to current through the recording device conducted by discharge device 45. The value of resistor 61 preferably is selected such that no net current is supplied to recording device 58 when vane 40 is about half-way inside air gap 44.

Assume that a voltage has just been applied between terminals 35 and 36. A small current begins to flow through galvanometer 38, and in response to this current movable member 39 rotates to move vane 40 further within air gap 44. This increases the inductance of winding 43, and causes discharge device 45 to conduct more current, in a manner similar to the operation of the Fig. 1 circuit hereinbefore described. Since the current conducted by rectifier 60 remains unchanged, the increase in current conducted by device 45 causes a net current flow through recording device 58 and resistor 37. The current flowing through resistor 37 produces a voltage drop which opposes the voltage applied between terminals 35 and 36. When this voltage drop exactly equals the applied voltage, no more current flows through galvanometer 38, and rotation of movable member 39 stops. Then there is no further change in the relative positions of vane 40 and the magnetic core 42, and the amount of net current through resistor 37 and recording device 58 remains unchanged until some change occurs in the value of voltage between terminals 35 and 36. Thus the device automatically maintains a voltage drop across resistor 37 which substantially equals and opposes the voltage applied between terminals 35 and 36, so that substantially no current is drawn from the circuit in which the measured voltage appears.

To maintain this voltage drop across resistor 37, the net current flowing through resistor 37 and recording device 58 must be proportional in value to the measured voltage. Since recording device 58 responds to the amount of net current supplied to it, it accurately records varying values of the voltage applied to the input terminals.

Having described the principle of this invention and the best mode in which I have contemplated applying that principle, I wish it to be understood that the examples described are illustrative only, and that other means may be employed without departing from the true scope of the invention.

What I claim as new and desire to secure by Letters Patent of the United States is:

1. Apparatus for recording a variable quantity, comprising a control vane, a magnetic core and a winding thereon, said core having an air gap and said vane being movable selectively into or out of said gap to vary the reluctance of said core, means for varying the relative position of said vane and said core responsive to variations in the quantity to be recorded, thereby varying the inductance of said winding, an electron discharge device having a control electrode, a current-responsive electrical recording device and means including a rectifier and a current limiting resistor connected in parallel circuit relationship with said discharge device for supplying electric current to said recording device, whereby the electric potential of said control electrode controls the amount of current supplied to said recording device, a regenerative feedback circuit connected to provide electric oscillations across said discharge device, a degenerative feedback circuit connected to reduce the amplitude of such oscillations, and a grid-leak bias resistor connected to said control electrode to apply thereto a negative bias potential substantially proportional to the amplitude of said oscillations, said winding being connected in said degenerative feedback circuit so that its inductance value controls the amount of degenerative feedback provided, whereby the relative positions of said vane and said core control the amount of current supplied to said recording device.

2. Apparatus for recording a variable quantity, comprising a control vane, a magnetic core and a winding thereon, said core having an air gap and said vane being movable selectively into or out of said gap to vary the reluctance of said core, means for varying the relative positions of said vane and said core responsive to variations in the quantity to be recorded, thereby varying the inductance of said winding, an electron discharge device having an anode, a control electrode and a cathode, a first capacitor and a tapped inductor and a second capacitor connected in series in the order named between said anode and said cathode, said winding being connected between said cathode and the tap of said tapped inductor, a third capacitor connected from said control electrode to the circuit junction between said tapped inductor and said second capacitor, a grid-leak bias resistor connected between said control electrode and said cathode, a choke coil, a current-responsive electrical recording device, a transformer having a primary winding and a secondary winding, said choke coil, recording device and secondary winding being connected in series between said anode and said cathode, connections for supplying alternating current to said primary winding, and a rectifier and a current-limiting resistor connected in series with said secondary winding and said recording device, the polarity of said rectifier being arranged to provide electric current through said recording device in the reverse direction to current conducted by said discharge device.

3. Apparatus for recording a variable quantity comprising two control members, one of said control members being a magnetic core having an air gap, the other of said control members being a vane movable selectively into or out of said gap to vary the reluctance of said core, a winding upon said core, said winding having an inductance value controlled by the reluctance of said core, an electron discharge device having a control electrode, a current-responsive electrical recording device and means including a rectifier and a current limiting resistor connected in parallel circuit relationship with said discharge device for supplying electric current to said recording device, whereby the electric potential of said control electrode controls the amount of current supplied to said recording device, said recording device being of a type having a movable element automatically positioned in conformity to the amount of such current, means for varying the position of one of said control members in conformity with variations in the position of said movable element, means for varying the position of the other of said control members in conformity with variations in the quantity to be recorded, a regenerative feedback circuit connected to provide electric oscillations across said discharge device, a degenerative feedback circuit connected to reduce the amplitude of such oscillations, and a grid-leak bias resistor connected to said control electrode to apply thereto a negative bias potential substantially proportional to the amplitude of said oscillations, said winding being connected in said degenerative feedback circuit so that its inductance value controls the amount of degenerative feedback provided, whereby the relative positions of said vane and said core control the amount of current supplied to said recording device.

4. Apparatus for rcording a variable electric quantity comprising a magnetic core having an air gap, a control vane movable selectively into or out of said gap to vary the reluctance of said core, a winding upon said core, said winding having an inductance value controlled by the reluctance of said core, an electron discharge device having an anode, a control electrode and a cathode, a first capacitor and a tapped inductor and a second capacitor connected in series in the order named between said anode and said cathode, said winding being connected between said cathode and the tap of said tapped inductor, a third capacitor connected from said control electrode to the circuit junction between said tapped inductor and said second capacitor, a grid-leak bias resistor connected between said control electrode and said cathode, a choke coil, a current-responsive electrical recording device, a transformer having a primary winding and a secondary winding, said choke coil, recording device and secondary winding being connected in series between said anode and said cathode, connections for supplying alternating current to said primary winding, a rectifier and a current-limiting resistor connected in series with said secondary winding and said recording device, the polarity of said rectifier being arranged to provide electric current through said recording device in the reverse direction to current conducted by said discharge device, said recording device being of a type having a movable element automatically positioned in conformity to the net amount of electric current supplied thereto, and an electrical instrument having a movable element automatically positioned in conformity to the value of the electrical quantity to be recorded, said magnetic core and said control vane being attached to respective ones of said movable elements so that variations in the relative positions of such movable members change the inductance value of said winding, whereby the electric current supplied to said recording device is controlled to maintain the movable elements of the recording device in a substantially constant position relative to the movable element of said electrical instrument.

5. Apparatus for recording a variable voltage, comprising two input terminals between which such voltage may be applied, a resistor and a galvanometer connected in series across said input terminals, said galvanometer being of a type having a movable element responsive to electric current, a control member attached to said movable element and positioned thereby, an electrical oscillator of a type which provides electric current in amounts controlled by the position of said control member, and a current-responsive electrical recording device connected to record variations in the amount of current provided by said oscillator, said resistor being connected in series with said recording device so that the current supplied to the recording device provides a voltage drop across said resistor which opposes the voltage applied between said input terminals.

6. Apparatus for recording a variable voltage, comprising two input terminals between which such voltage may be applied, a first resistor and a valvanometer connected in series across said input terminals, said galvanometer being of a type having a movable element responsive to electric current and having negligible restoring torque, a control vane attached to said movable element and positioned thereby, a magnetic core and a winding thereon, said core having an air gap and said vane being movable selectively into or out of said gap by movement of the galvanometer movable element to vary the reluctance of said core, whereby passage of electric current through said galvanometer changes the inductance of said winding, an electron discharge device having a control electrode, a current-responsive electrical recording device and means for supplying electric current connected in series with said discharge device, whereby the electric potential of said control electrode controls the amount of current supplied to said recording device, a regenerative feedback circuit connected to provide electric oscillations across said discharge device, a degenerative feedback circuit connected to reduce the amplitude of such oscillations, and a grid-leak resistor connected to said control electrode to apply thereto a negative bias potential substantially proportional to the amplitude of said oscillations, said winding being connected in said degenerative feedback circuit so that its inductance value controls the amount of degenerative feedback provided, whereby the relative positions of said vane and said core control the amount of current supplied to said recording device, said first resistor also being connected in series with said recording device, whereby such current provides a voltage drop across said first resistor which opposes the voltage applied between said input terminals.

7. Apparatus for recording a variable voltage, comprising two input terminals between which such voltage may be applied, a first resistor and a galvanometer connected in series across said input terminals, said galvanometer being of a type having a movable element responsive to electric current and having negligible restoring torque, a control vane attached to said movable element and positioned thereby, a magnetic core and a winding thereon, said core having an air gap and said vane being movable selectively into or out of said gap by movement of the galvanometer movable element to vary the reluctance of said core, whereby passage of electric current through said galvanometer changes the inductance of said winding, an electron discharge device having an anode, a control electrode and a cathode, a first capacitor and a tapped inductor and a second capacitor connected in series in the order named between said anode and said cathode, said winding being connected between said cathode and the tap of said tapped inductor, a third capacitor connected from said control electrode to the circuit junction between said tapped inductor and said second capacitor, a grid-leak bias resistor connected between said control electrode and said cathode, a choke coil, a current-responsive electrical recording device, a transformer having a primary winding and a secondary winding, said choke coil, recording device and secondary winding being connected in series between said anode and said cathode, connections for supplying alternating current to said primary winding, and a rectifier and a current-limiting resistor connected in series with said secondary winding and said recording device, the polarity of said rectifier being arranged to provide electric current through said recording device in the reverse direction to current conducted by said discharge device, said first resistor also being connected in series with said recording device, whereby electric current supplied to the recording device produces a voltage drop across said first resistor which opposes the voltage applied between said input terminals.

THEODORE A. RICH.

References Cited in the file of this patent
UNITED STATES PATENTS

| Number | Name | Date |
|---|---|---|
| 2,446,390 | Rath | Aug. 3, 1948 |
| 2,458,731 | Rath | Jan. 11, 1949 |
| 2,527,797 | Cohen | Oct. 31, 1950 |
| 2,559,789 | Peckham | July 11, 1951 |
| 2,576,611 | Lang et al. | Nov. 27, 1951 |